Figure 1:
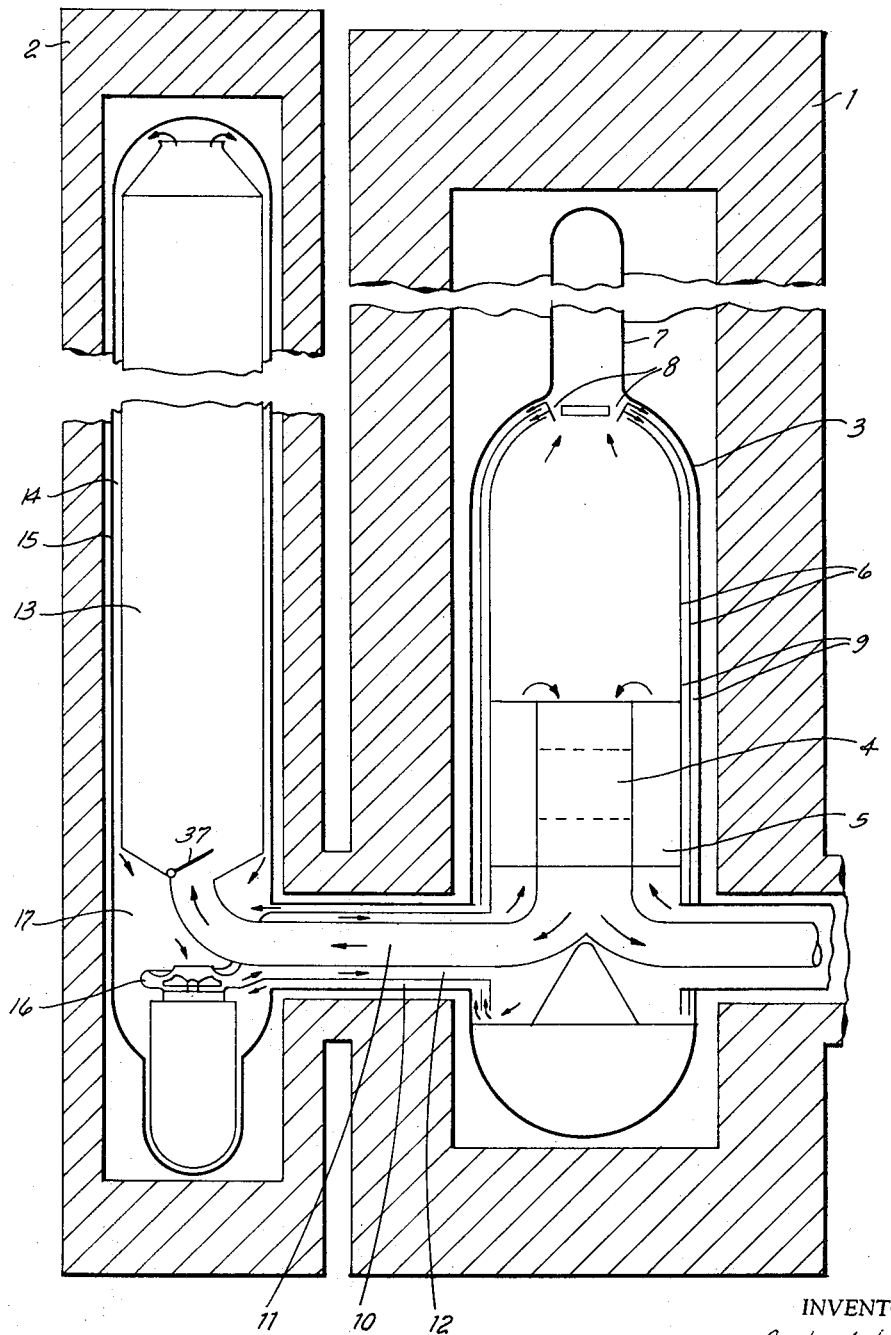

Dec. 12, 1967   G. SCHMIDT   3,357,892
GAS COOLED NUCLEAR REACTOR
Filed April 23, 1965   2 Sheets-Sheet 1

INVENTOR.
Gerhard Schmidt
BY
Michael J. Striker

3,357,892
GAS COOLED NUCLEAR REACTOR
Gerhard Schmidt, Leopoldshafen, Germany, assignor to Gesellschaft fur Kernforschung m.b.H., Karlsruhe, Germany
Filed Apr. 23, 1965, Ser. No. 450,693
Claims priority, application Germany, Apr. 29, 1964, G 40,488
6 Claims. (Cl. 176—60)

The invention relates to a gas-cooled nuclear reactor the core of which is surrounded by a high-pressure vessel out of which the cooling gas is fed into separately set up heat exchangers by means of circulating blowers.

In gas-cooled reactors of high power density, especially in fast reactors, the coolant is kept under a high operating pressure. In case the pressure vessel should become leaky, the coolant will flow out of the vessel at a high rate. This loss of coolant is a very dangerous cause of accident, because the reactor may melt down due to the loss of cooling effect. At least in fast reactors the after-heat alone may be so high as not to be removed by the coolant at atmospheric pressure. If the coolant system should become leaky, it must be possible therefore even after a scram to maintain a minimum pressure in the reactor of some 10 percent of the operating pressure. For this purpose a second containment has been placed around the primary system. However, this makes the cost of building the plant very high. It has been suggested therefore to design only one of the two containments to the full operating pressure. The second containment then is merely intended to maintain the emergency cooling pressure required to remove the after-heat. It may thus be relatively thin and inexpensive. Generally, it is arranged around the high-pressure vessel. The clearance then is almost without any pressure during normal operation. In case the high-pressure vessel should become leaky, the outer vessel maintains the pressure at the level required for emergency cooling. In order to reduce the large volume of the outer containment this requires, the cooling gas may be pumped off into storage containers in case of minor leakages and it may be discharged into the atmosphere in major leakages. This relatively inexpensive design, however, has another major disadvantage of a possibly instantaneous failure of cooling in the core when the cooling transport from the blower into the core suddenly becomes leaky. Under the prevailing supercritical pressure the gas will instantaneously flow out at the velocity of sound and is then lost for cooling purposes. In some cases cooling may even fail instantaneously so that the core may easily melt down. The core then cannot be prevented from melting down even by fast shutdown of the reactor. The second containment in this case remains ineffective, i.e. on principle there are the same conditions as in the gas-cooled thermal reactors of familiar design (Calder Hall), where no second containment was planned from the outset. However, because of the low power density and the very high thermal capacity of the reactor core this type of accident in a Calder Hall reactor will merely result in an undesired, but still—by careful designing—still controllable overheating of the core. In a highly loaded, fast reactor, however, this accident has to be avoided with certainty. So far, the only known solution of this problem has consisted in surrounding particularly sensitive parts within the dangerous area (e.g. charging machine and control rod support) with a second containment closely placed around the first one and also designed so as to withstand operating pressures. This is only another emergency solution, however. Moreover, it is difficult to fabricate this type of vessel, especially so in the size required.

Thus, it is the task of this invention to create a nuclear reactor where the coolant within the high-pressure vessel is transported in such a way as to still flow through the core as much as possible even when there is a leakage in the vessel, i.e. that even then it remains useful for its specific purpose, cooling.

This is achieved in the invention by the reactor having an inner vessel practically completely covering the inner surface of the high-pressure vessel, at least in the region of cooling gas inlet, the space between the vessels being connected to the intake side of at least one circulating blower.

The inner container does not have to sustain high pressures. In normal operation it has to sustain only a maximum pressure corresponding to the pressure increment of the cooling gas in the circulating blower, thus, its walls may be relatively thin.

Finally, it must not be even gas tight, is thus easy to install, and the ducts for the charging machine and the control rods do not introduce any difficulties either. A low leakage rate is even desirable, because this will cool the wall of the high-pressure vessel.

Especially important is the possibility of using the thermal shield for the inner vessel, the thermal shield has to be installed in fast breeders anyway to protect the wall of the vessel. In normal design it already consists of several layers of thick steel sheet metal with cooling plates in between. Thus, the sheets only have to be shaped in such a way and joined so as to form a closed vessel together which is connected to the blower by a gastight channel. In this design the full feed pressure of the circulating blower may be used for cooling the outside wall of the high-pressure vessel of the thermal shield, and the supporting structure. The arising short-circuit losses are insignificant.

Figure 2:
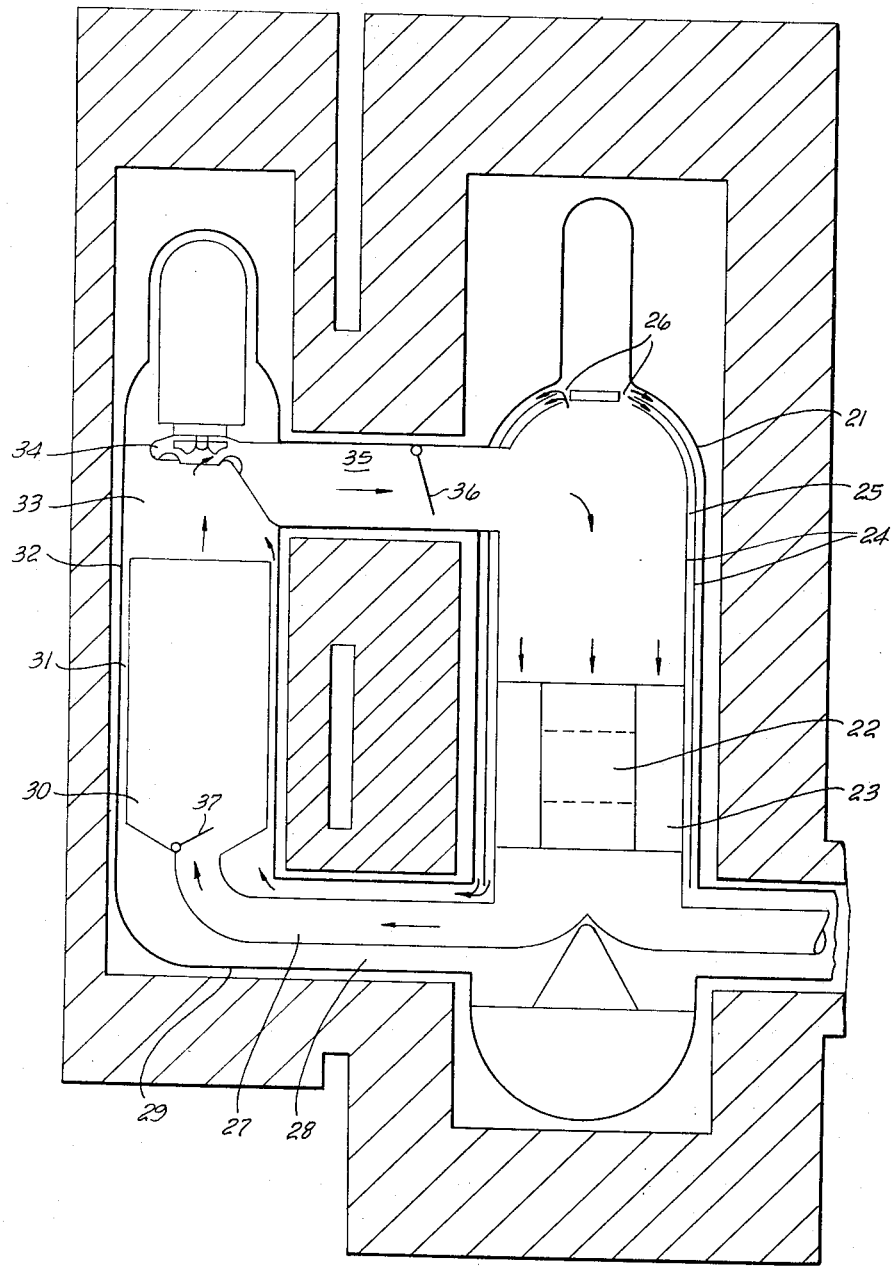

Details of the invention are explained on the basis of the drawings wherein FIGS. 1 and 2 show two embodiments thereof.

FIG. 1 shows a reactor installation the second containments 1 and 2 of which are designed so as to sustain only the emergency cooling pressure, consisting of prestressed concrete for the reactor proper as well as for the heat exchangers arranged around it. Containment 1 contains the high-pressure vessel 3 surrounding the core 4 with the blanket 5 around it. At its end the vessel 3 has a tubular attachment 7 which is to house the charging machine. The thermal shield 6 which is to protect the high-pressure vessel 3 from the radiation coming from the fast core is made into a continuous inner container 6 consisting of several layers.

In the execution according to FIG. 1 the cooling gas coming from the circulation blower first flows through the annular blanket 5 and then, on its way back, through the core 4. A small portion of the cooling gas flow penetrates through the openings 8, which may be provided at the same time for the introduction of the charging machine, and through the rest of the leaks in the inner vessel 6 into the chamber 9 between it and the outer pressure vessel 3 and then flows through additional conduit means, namely, the connecting channel 10 to the intake chamber 17 of the cooling blower 16. The thermal shield and the pressure vessel are cooled by this bypass flow. The main flow of cooling gas flows through the core 4 and is then fed into a heat exchanger 13 through a pipe duct 11 preferably situated centrally in the duct 12 transporting the cooling gas to the core. Through the gap 14 between heat exchanger 13 and pressure vessel 15 cooling gas flows back to the blower 16. In this design the clearance 9 between the pressure vessel 3 and the inner vessel 6 has an open connection leading to the intake chamber 17 ahead of the blower. The openings 8 are designed so as to form throttle passages through which only a small amount of cooling gas is allowed to flow. In case the pressure vessel 3 should become leaky in some place, practically all cooling gas flowing out of the leak from the intake chamber 17, has to flow to the point of leakage. However, this means that it has to flow first through the core and then even through the heat exchanger in order to arrive at the point of leakage.

The connection between reactor and heat exchanger by means of concentric tubes shown in FIG. 1 offers special advantages because the pipe duct 11 transporting the heated cooling gas out of the reactor is placed inside the cooler feed duct 12. Yet, this is not the only possibility of utilizing the advantages arising from this invention.

Therefore, an example of an execution of the invention is described on the basis of FIG. 2, where the cooling gas is introduced into the reactor pressure vessel 21 above the core and leaves it through the openings below the core. The gas flows in parallel through the core 22 and the blanket 23. Through the outlet duct 27 it is transported to the heat exchanger 30 and then blown into the reactor again by the circulating blower through the pressurizing duct. In this arrangement, too, the thermal shield 24 within the pressure vessel 21 is combined so as to form a closed vessel leaving a clearance 25 between it and the pressure vessel 21. Part of the coolant flow enters into the core 25 through the throttle openings 26, flowing through it in order to cool the pressure vessel 21 and the thermal shield 24. Through the annular space 28 between outlet duct 27 and pressurizing duct 29 it flows through the annular channel 31 between heat exchanger 30 and containment 32 into the intake chamber of the circulating blower 34. Through a pressure-resistant intermediate duct 35 the cooling gas is then blown into the reactor vessel again. In this arrangement, too, the core 25 has an open connection with the intake chamber 33 ahead of the circulating pump so that also the cooling gas has to flow through the core before it may escape from the reactor pressure vessel into the open air through a leak.

In order to prevent cooling gas from flowing back from the reactor through the pump even in case of a large pressure drop ahead of the circulating pump or in case of failure of a circulating pump, a non-return valve 36 has been installed in the coolant inlet duct of the reactor. Of course, a similar non-return valve 37 (FIGS. 1 and 2) may be installed also in the outlet lines 11, or 27, respectively.

In one advanced development of the invention the space between the inner vessel and the pressure vessel is connected to the intake chamber ahead of the circulating pump only in part of the heat exchangers arranged around the reactor. In this case, it is preferable to provide this connection in only about half of the heat exchangers. In case the pressure in the intake chamber of the circulating blower drops very sharply due to a major leakage in the pressure vessel, it may well happen that the blower does not transport any more cooling gas. In this case the core is still fully cooled by those circulating pumps whose intake chamber is not connected to the space between inner vessel and pressure vessel.

On principle, the shields practically have to cover the inner surface of the pressure vessel completely, at least in the region of the cooling gas inlet. In reactors with the pressure vessel shielded in the core region by metal shields therefore one or more of the shields may be expanded to inner vessels covering the pressure vessel, and the space between the vessel may be connected to the intake of the circulating blower by means of a connecting duct. On principle, the intake side shall be the region of low pressure between core and circulating blower. It is specially advantageous to establish a connection of the spaces between the vessels the intake chamber directly ahead of the circulating blower, because there the cooling gas has the lowest temperature and the lowest pressure.

For the sake of completeness it is pointed out here that cooling gas in the sense of the invention shall mean any compressible coolant, i.e. also steam.

I claim:

1. A gas-cooled nuclear reactor arrangement comprising, in combination, a high-pressure vessel; a reactor core arranged within said vessel spaced from the inner surface thereof; a heat shield arranged also within said high-pressure vessel at least between said core and the inner surface of said high-pressure vessel spaced from the latter and thus forming an annular cooling space between itself and the inner surface of the vessel; a gas-coolant circulating means having an intake side and an output side; pressure conduit means connected at one end to the output side of said coolant circulating means and terminating at the other end in said high-pressure vessel inside of said heat shield for guiding gas coolant into the same for cooling of said reactor core; a heat exchanger; exhaust conduit means leading from said high-pressure vessel to said heat exchanger for guiding the coolant medium heated in said high-pressure vessel to said heat exchanger for cooling thereof; return conduit means connected at one end to said heat exchanger and at the other end to said intake side of said coolant circulating means for guiding the coolant back to said coolant circulating means; and additional conduit means connecting said return conduit means carrying the gas coolant cooled in said heat exchanger with said annular cooling space between said inner surface of said high-pressure vessel and said heat shield, whereby in the event a leak develops in said high-pressure vessel cooling medium will be admitted through said additional conduit into said annular cooling space and cool the leaking portion of said high-pressure vessel so as to prevent any further damage thereto by the heat created in said high-pressure vessel during nuclear reaction.

2. A gas-cooled nuclear reactor according to claim 1, wherein said additional conduit is connected to the one end of said annular cooling-space between the inner face of said high-pressure vessel and said heat shield and wherein the other end of said annular space is connected to the interior of said high-pressure vessel inside said heat shield.

3. A gas-cooled nuclear reactor according to claim 2, including gas-flow throttling means arranged on said other end of said annular space so as to permit throttled flow by cooling gas from said interior of said high-pressure vessel, into said annular space, through said annular space and said additional conduit, and into said return conduit in the absence of any leak in said high-pressure vessel.

4. A gas-cooled nuclear reactor according to claim 1, wherein said gas-coolant circulating means and said heat exchanger are located spaced from said high-pressure vessel.

5. A gas-cooled nuclear reactor according to claim 1, including an intake chamber associated with said coolant circulating means and interposed between said additional conduit and said return conduit.

6. A gas-cooled nuclear reactor according to claim 1, wherein said gas-coolant circulating means is a blower.

References Cited

UNITED STATES PATENTS

| | | | |
|---|---|---|---|
| 2,997,435 | 8/1961 | Millar et al. | 176—59 |
| 3,089,835 | 5/1963 | Schulten et al. | 176—59 X |
| 3,159,549 | 12/1964 | Moore et al. | 176—60 X |
| 3,194,744 | 7/1965 | Ainley et al. | 176—60 |
| 3,210,254 | 10/1965 | Fortescue | 176—60 |

FOREIGN PATENTS

| | | |
|---|---|---|
| 1,148,664 | 5/1963 | Germany. |
| 624,362 | 10/1962 | Belgium. |

REUBEN EPSTEIN, *Primary Examiner.*